A. A. BALLMER.
PISTON RING.
APPLICATION FILED MAR. 14, 1916.
1,225,101.
Patented May 8, 1917.
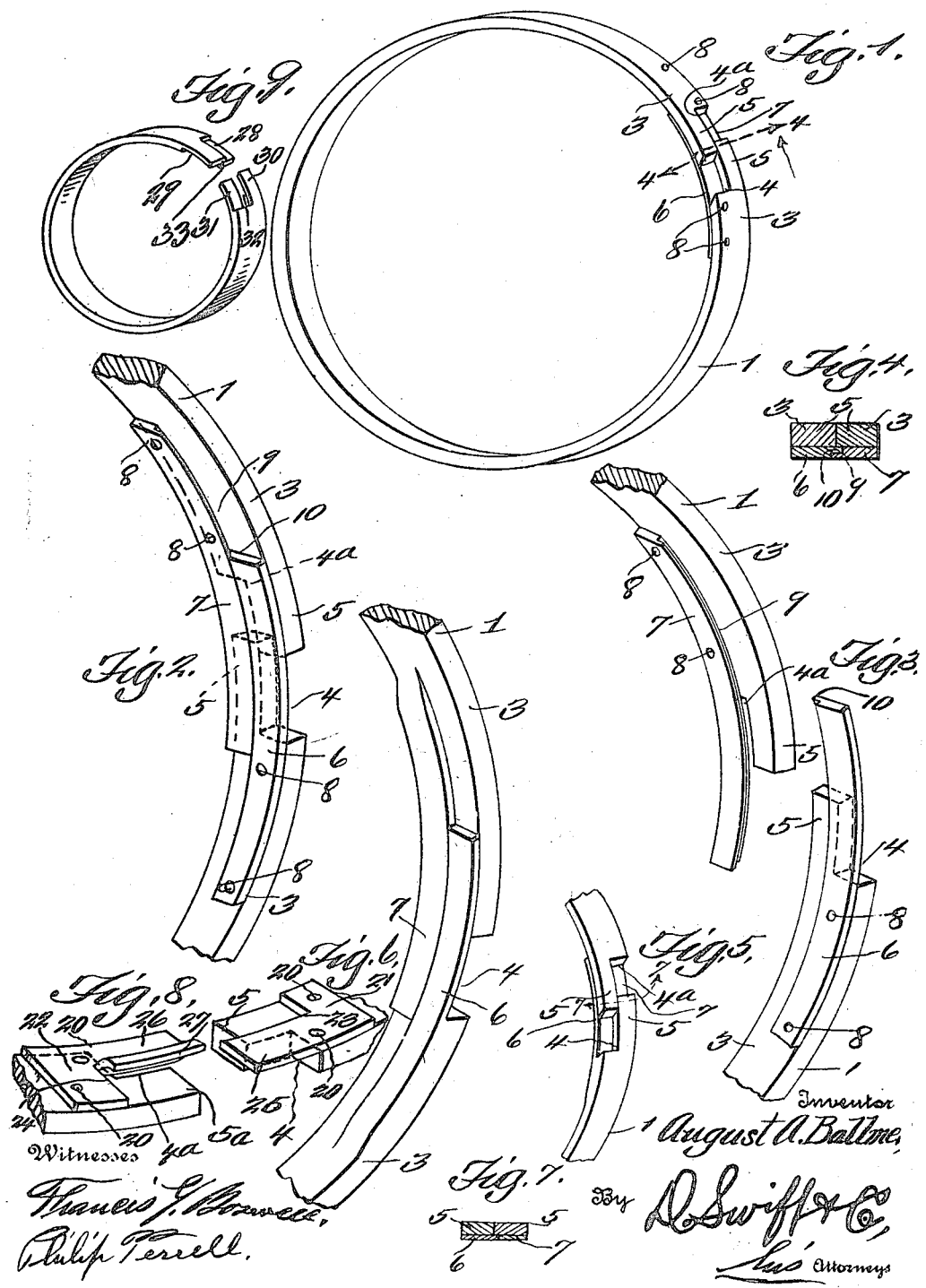

UNITED STATES PATENT OFFICE.

AUGUST A. BALLMER, OF LOMA, COLORADO.

PISTON-RING.

1,225,101.

Specification of Letters Patent.     Patented May 8, 1917.

Application filed March 14, 1916. Serial No. 84,080.

*To all whom it may concern:*

Be it known that I, AUGUST A. BALLMER, a citizen of the United States, residing at Loma, in the county of Mesa, State of Colorado, have invented a new and useful Piston-Ring; and I do hereby declare the following to be a full, clear, and exact description of the invention, such as will enable others skilled in the art to which it appertains to make and use the same.

This invention relates to an improved expansible piston ring, which is applicable to pistons and the like, to prevent leakage of steam or other expansive fluids.

One of the objects of the invention is to provide a piston ring, which is tapering in thickness in opposite directions from one side of the ring to a diametrically opposite side, thereby affording means to cause the ring to expand uniformly against the cylindrical wall of the cylinder.

Another object of the invention is to provide the adjacent ends (which are located where the thickness of the ring is less than at the diametrically opposite side) of the ring with overlapping interlocking parts, including overlapping cover plates, thereby affording a joint which is steam or fluid escape-proof.

In practical fields the details of construction may necessitate alterations, falling within the scope of what is claimed.

The invention comprises further features and combination of parts, as hereinafter set forth, shown in the drawings and claimed.

In the drawings:

Figure 1 is a view in perspective of the improved ring shown in accordance with the invention.

Fig. 2 is an enlarged detail view of the united ends of the ring.

Fig. 3 is a view similar to Fig. 2 showing the two ends separated.

Fig. 4 is a transverse sectional view on line 4—4 of Fig. 1.

Fig. 5 is a detail view of the adjacent ends of a ring, showing the joint, and showing the recess 9 and rib 10 eliminated.

Fig. 6 is a detail perspective view of the same structure as shown in Fig. 5, showing the plates 6 and 7 integral with the ring.

Fig. 7 is a view on line 7—7 of Fig. 5.

Fig. 8 is a detail perspective view of the adjacent ends of a packing ring showing a modified structure of joint.

Fig. 9 is a detail perspective view of a concentric packing ring illustrating a modified structure of joint between the adjacent ends of the ring.

Referring more especially to the drawings, 1 designates a piston ring as a whole, and which may be constructed of any suitable metal, and any required diameter, and the wall of any suitable thickness or width. The ring at one portion is thicker than at the diametrically opposite portion, where the ends 3 of the ring are provided with diagonally opposite angular recesses 4 and 4ª, thereby causing the formation of diagonally opposite tongues 5, so that when the ring is partially contracted for fitting a piston or the like, the tongues will enter said recess, so that when the ring expands and contracts during the reciprocating movement of the piston the adjacent ends will slide relative to each other. From its thickest point the ring tapers circumferentially in opposite directions toward and to the adjacent ends, thereby insuring resiliency for the ring, in order that it will contract and expand incident to its engagement with the cylindrical wall of the cylinder. Carried by the inner faces of the adjacent ends of the ring are elongated plates 6 and 7. It is to be noted that these plates may be riveted at 8 upon the inner faces of the adjacent ends of the ring, or welded thereto, or formed thereon from the material or stock from which the ring is constructed. The elongated plate 6 is sufficiently elongated, to underlie the angular recess 4, while the plate 7 is correspondingly sufficiently elongated to underlie the recess 4ª. One edge of the plate 7 is undercut, to form an elongated recess 9, to slidably receive the rib 10 upon one edge of the plate 6. The rib 10 projects sufficiently from the plate 6 to partially underlie the recess 4ª, that is, where the rib engages the elongated recess in the plate 7, thereby preventing the escape of steam or fluid, thereby affording an efficient and practical expansible piston ring. Owing to the plate 6 underlying the recess 4, and edgewise lapping the plate 7, which in turn underlies the recess 4ª, and to the fact that the tongues will edgewise lap and the plates 6 and 7 also edgewise lapping, it is to be noted that the adjacent ends will not spring laterally from each other, or otherwise disconnect.

In Fig. 8 another form of joint is disclosed, which comprises the diagonally oppositely disposed notches or recesses 4ª and 4, which receive the diagonally oppositely disposed tongues 5 and 5ª, that is, when the adjacent ends of the ring are brought together. Secured upon the inner faces of the adjacent parts or ends of the ring by means of rivets or the like 20 are the plates 21 and 22, which have diagonally oppositely disposed recesses 23 and 24, which receive the diagonally oppositely disposed tongues 26 and 25, that is, when the adjacent ends of the ring are brought together. It is to be noted that the recesses 23 and 24, and the tongues 25 and 26 are of greater length than the recesses 4 and 4ª and the tongues 5 and 5ª. Furthermore, it will be seen that the recess 23 is formed adjacent the tongue 5, and the tongue 25 is formed adjacent to and over the recess 4. The same arrangement of the corresponding parts of the opposite ends of the ring is provided so that the two ends of the ring will interlock securely. However, the tongue 26 is provided with a laterally extending flange 27, to overlie the tongue 25, when the two ends of the ring are interlocked. Moreover, the tongue 25, as will be seen in Fig. 8 overlies the side of the tongue 5, thereby preventing the leakage when the two ends of the ring are interlocked. In Fig. 9 there is shown a concentric ring, instead of an eccentric ring, as shown in Fig. 1. In Fig. 9, it is to be seen that one end of the ring is provided with adjacent recesses 28 and 29, the recess 28 being on the exterior surface of the ring, while the recess 29 is on the interior.

The opposite end of the ring terminates in tongues 30 and 31, which are spaced apart diagonally as shown at 32, and are of a thickness corresponding to the depth of the recesses 28 and 29, so that when the adjacent ends of the ring are brought together, the tongues 30 and 31 will enter the recesses 28 and 29, the space 32 receiving that portion 33 of the ring or metal between the recesses 28 and 29, thereby providing packing rings, which present smooth interior and exterior surfaces. It is to be noted that in constructing the ring shown in Fig. 9, the parts of the joint will be machined, or otherwise constructed, while in Fig. 8 the recesses 4 and 4ª and 23 and 24 are machined, but the plates 21 and 22 are riveted to the adjacent ends of the ring. However, the structure in Fig. 8 may be machined from the adjacent ends of the ring, the same as in Fig. 9, if it is so desired, thereby constructing all the parts integral. This form or structure of joint may be applied to an eccentric or concentric ring, and in so far as the proportions and detail measurements, and shape or contour are concerned, the right is reserved to vary them accordingly.

The invention having been set forth, what is claimed as new and useful is:

1. An expansible piston ring having free ends provided with diagonally opposite angular recesses and tongues, said tongues being edgewise lapped, the inner faces of the adjacent ends having elongated plates edgewise lapping, the adjacent ends of the plates underlapping the diagonally disposed recesses of the adjacent ends and underlapping the opposite tongues, the inner edge of one plate being undercut to form a recess, the inner edge of the opposite plate having an elongated rib to slidably engage the recess formed by the undercut, said rib overlapping one of the first angular recesses.

2. An expansible piston ring having free ends, each end having an angular recess and an adjacent tongue, disposed diagonally to a corresponding recess and tongue of the opposite end, so that said tongues will enter said recesses, a pair of plates secured to the inner faces of the adjacent free ends, each having a tongue reversely disposed to the first tongues, so that the tongues of the plates will edgewise lap, the said tongues of said plates having portions constituting an edgewise and radially overlapping joint, said tongues of the plates being of greater length than the recesses and tongues of the adjacent free ends of the ring, thereby affording a lap joint at the ends of the recesses and tongues.

In testimony whereof I have signed my name to this specification in the presence of two subscribing witnesses.

AUGUST A BALLMER.

Witnesses:
JOHN DENNIS,
H. G. MCELFRESH.

Copies of this patent may be obtained for five cents each, by addressing the "Commissioner of Patents, Washington, D. C."